United States Patent
Brown

(10) Patent No.: US 6,586,082 B1
(45) Date of Patent: *Jul. 1, 2003

(54) POLYMER-SATURATED PAPER ARTICLES

(75) Inventor: Katherine A. Brown, Lake Elmo, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/836,395

(22) PCT Filed: Nov. 15, 1995

(86) PCT No.: PCT/US95/14923
§ 371 (c)(1),
(2), (4) Date: May 6, 1997

(87) PCT Pub. No.: WO97/18350
PCT Pub. Date: May 22, 1997

(51) Int. Cl.$^7$ .............................. B32B 7/00; C08F 18/24; C08F 112/02
(52) U.S. Cl. ..................... 428/211; 428/462; 526/314; 526/346
(58) Field of Search ................................ 428/211, 462; 526/314, 346

(56) References Cited

U.S. PATENT DOCUMENTS

| | | | |
|---|---|---|---|
| 2,519,983 A | 8/1950 | Simons | 204/62 |
| 2,532,011 A | 11/1950 | Dahlquist et al. | 154/53.5 |
| 2,803,656 A | 8/1957 | Ahlbrecht et al. | 260/556 |
| 3,476,753 A | 11/1969 | Hansen | 260/247.1 |
| 3,542,717 A | 11/1970 | Lipman | 260/27 |
| 3,546,183 A | 12/1970 | Vergne et al. | 260/78.4 |
| 3,635,755 A | 1/1972 | Balinth et al. | 117/122 P |
| 3,734,962 A | 5/1973 | Niederprum et al. | 260/556 F |
| 3,926,717 A | 12/1975 | Marchessault et al. | 162/157 C |
| 3,954,697 A | 5/1976 | McConnell et al. | 526/350 |
| 3,957,724 A | 5/1976 | Schurb et al. | 260/46.5 E |
| 4,072,813 A | 2/1978 | McConnell et al. | 526/348.2 |
| 4,178,272 A | 12/1979 | Meyer, Jr. et al. | 260/27 R |
| 4,181,752 A | 1/1980 | Martens et al. | 427/54.1 |
| 4,250,063 A | 2/1981 | Kotani et al. | 260/4 |
| 4,259,470 A | 3/1981 | Trotter et al. | 526/348.2 |
| 4,288,358 A | 9/1981 | Trotter et al. | 260/31.8 M |
| 4,311,810 A | 1/1982 | Fujii et al. | 525/321 |
| 4,329,384 A | 5/1982 | Vesley et al. | 428/40 |
| 4,386,135 A | 5/1983 | Campbell et al. | 428/447 |
| 4,416,950 A | 11/1983 | Muller et al. | 428/537 |
| 4,826,939 A | 5/1989 | Stuart, Jr. | 526/348.5 |
| 4,923,936 A | 5/1990 | Goodall et al. | 526/115 |
| 4,923,943 A | 5/1990 | Hara et al. | 526/283 |
| 4,943,621 A | 7/1990 | Janda et al. | 526/127 |
| 4,945,144 A | 7/1990 | Grubbs et al. | 526/268 |
| 4,994,535 A | 2/1991 | Endo et al. | 526/259 |
| 5,011,730 A | 4/1991 | Tenney et al. | 428/209 |
| 5,112,882 A | 5/1992 | Babu et al. | 522/158 |
| 5,194,189 A | 3/1993 | Papastavros et al. | 264/22 |
| 5,194,501 A | 3/1993 | Babu et al. | 525/103 |
| 5,198,511 A | 3/1993 | Brown-Wensley et al. | 526/113 |
| 5,202,361 A | 4/1993 | Zimmerman et al. | 522/120 |
| 5,209,971 A | 5/1993 | Babu et al. | 428/343 |
| 5,294,668 A | 3/1994 | Babu | 525/80 |
| 5,296,433 A | 3/1994 | Siedle et al. | 502/117 |
| 5,296,566 A | 3/1994 | Brown-Wensley et al. | 526/171 |
| 5,354,619 A | 10/1994 | Babu | 428/462 |
| 5,491,206 A | 2/1996 | Brown-Wensley et al. | 526/126 |

FOREIGN PATENT DOCUMENTS

| | | | |
|---|---|---|---|
| EP | 0 003 194 | 7/1979 | C09J/3/14 |
| EP | 0 147 035 | 7/1985 | D21H/3/02 |
| EP | 0 303 969 | 2/1989 | |
| JP | 59-157106 | 9/1984 | C08F/297/08 |
| JP | 61-296036 | 12/1986 | B32B/15/08 |
| WO | WO 92/07916 | 5/1992 | C09J/123/18 |

OTHER PUBLICATIONS

R. H. Marchessault, B. Fisa, and J. F. Revol, "Nascent Polyethylene–Cellulose Composite", *ACS Symposium Series, No. 10, Cellulose Technology Research*, p. 147–159, American Chemical Society (1975).

Technical Bulletin No. AL–134, "Handling Air–Sensitive Reagents," Aldrich Chemical Company, Inc. (1983).

"Films, Multilayer," *Encyclopedia of Polymer Science and Engineering*, vol. 7, p. 116–8, John Wiley & Sons, Inc. (1987).

"Metathesis Polymerization," *Encyclopedia of Polymer Science and Engineering*, vol. 9, p. 634–44, John Wiley & Sons, Inc. (1987).

Armitage, D.A., "Organosilanes", *Comprehensive Organometallic Chemistry*, vol. 2, Ch. 9.1, p. 117–20, Pergamon Press, Oxford (1982).

Boor, J. Jr., "Polymerization of Monomers," *Ziegler–Hatta Catalysts and Polymerizations*, Ch. 19, p. 512–62, Academic Press (1979).

Ciardelli, F. et al., "From Heterogeneous to Homogeneous Catalysis in Monoalkene Polymerization," *Comprehensive Polymer Science*, 1$^{st}$ Supp., Ch. 4, p. 77–78, Pergamon Press ( ).

Hudlicky, M. (ed.), "Electrochemical Fluorination Process," *Chemistry of Organic Fluorine Compounds*, 2$^{nd}$ Ed., p. 73–76, Ellis Horwood Ltd. (1976).

March, J., "Stereochemistry," *Advanced Organic Chemistry: Reactions, Mechanisms, and Structure*, 4$^{th}$ ed., p. 150–61, John Wiley & Sons, Inc. (1992).

(List continued on next page.)

Primary Examiner—Cynthia H. Kelly
Assistant Examiner—L. Ferguson
(74) *Attorney, Agent, or Firm*—Steven E. Skolnick; Lisa M. McGeehan; Philip Y. Dahl

(57) ABSTRACT

A composite article includes a paper substrate, at least a portion of which is saturated with either a polymerizable ring-strained olefin monomer or the polymerization product of such a monomer. The polymerization of such monomers are catalyzed by transition metal-containing species. These paper saturated articles are useful as, inter alia, packaging materials, release liners, and backings.

15 Claims, No Drawings

OTHER PUBLICATIONS

Odian, G., "Ziegler–Natta Poymerization of Nonpolar Vinyl Monomers," *Principles of Polymerization*, 2$^{nd}$ ed., p. 591–623, John Wiley & Sons ( ).

Shriver, D., *The Manipulation of Air–sensitive Compounds*, McGraw–Hill, Inc. (1969).

Swasey, C., "Antioxidants," *Plastics Additives and Modifiers Handbook*, Ch. 14, p. 193–202, Van Norstrand Reinhold (1992).

Tait, P., "Monoalkene Polymerization: Ziegler–Natta and Transition Metal Catalysts," *Comprehensive Polymer Science*, vol. 4, p. 1–6, Pergamon Press ( ).

POLYMER-SATURATED PAPER ARTICLES

This application is a continuation-in-part of U.S. Ser. No. 08/281,733, currently pending, which is incorporated herein by reference.

BACKGROUND OF THE INVENTION

1. Field of the Invention

The present invention relates to a process for the polymerization of mixtures impregnated into or supported on paper, that comprise one or more ring-strained olefinic monomers, the polymerization of each monomer being mediated by a transition metal-containing species.

2. Description of Related Art

Polymer films coated on substrates and as stand-alone constructions find a multitude of uses. Likewise, methods of producing polymer films are myriad, depending upon a variety of factors such as, for example, the polymer, the substrate, and the intended end use.

Polymeric coatings are most often produced by distribution of a thin layer of an already-formed polymer onto a substrate from a solvent, an emulsion or a suspension. Alternatively, the polymer may be extruded or hot-melt coated directly onto a substrate so that no solvent or suspending medium is involved.

Free-standing polymer films are prepared by a number of methods, including extrusion, blow molding, and casting, the latter method including the variant of coating onto a release liner and removing the release liner at some later time. In most cases, these methods use already-polymerized compositions.

Coating of monomeric compositions followed by on-substrate polymerization to obtain free-standing films or coated substrates is a less-common procedure. Typically, such procedures involve free-radically polymerizable monomers such as (meth)acrylates and a suitable free-radical initiator; require application of energy to initiate polymerization; normally include a means for controlling the polymerization exotherm associated with highly-reactive monomers; and require the provision of an atmosphere that does not inhibit free-radical polymerizations (i.e., is essentially free of oxygen).

Non-free radical polymerizations of ethylenically-unsaturated monomers are well known. These polymerizations typically use catalysts instead of initiators to effect polymerization. Examples of such polymerizations include Ziegler-Natta polymerizations (ZN), ring-opening metathesis polymerizations (ROMP), group transfer polymerizations (GTP), and cationic and anionic polymerizations. Catalysts for these polymerizations can be more susceptible to deactivation by adventitious oxygen and water, requiring that such deactivating materials be rigorously excluded from all reagents as well as the reaction vessel.

Specifically, ZN (co)polymerizations of monoolefins, particularly α-olefins, are well known in the art. Typically, extreme care is taken to exclude both oxygen and water from these polymerizations.

Likewise, ROMP (co)polymers are known in the art. Examples of ROMP processes in both inert conditions and in the presence of water, oxygen, or both are known.

The properties of various papers can be improved when polymeric materials are used as saturants or coatings. When the polymer saturates at least a portion of the paper, improved adhesion between the polymer and the paper is obtained. Such a configuration is most often obtained by coating a solution of the polymer onto the paper, allowing the solution to penetrate at least a portion of the paper, and subsequently evaporating the solvent. Solvent processing has fallen into disfavor because of cost and environmental consequences, however.

Water suspensions or emulsions of polymers can also be used to produce polymer-saturated paper in those limited situations where an aqueous dispersion or emulsion of the polymer is feasible. Even when such a dispersion or emulsion is possible, the coated paper can absorb larger quantities of water. This can lead to configurations quite different from those achieved by solvent coating.

Neat polymerizations within the paper itself (e.g., saturating the paper with monomer and polymerizing the monomer) are normally unavailable because most polymerization systems are sensitive to one or more of oxygen, water, acids, bases, certain functional groups (e.g., those containing an active hydrogen-containing group), etc., any or all of which can be present in paper.

SUMMARY OF THE INVENTION

Briefly, the present invention provides a process for making a poly(olefin) film in an in-line procedure comprising the steps:

a) providing a substrate coated with a layer of a mixture comprising
(1) at least one olefinic monomer, having 5 to 30 carbon atoms, having one of the formulae

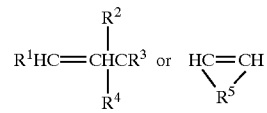

wherein
(A) $R^1$ is hydrogen and $R^2$, $R^3$, and $R^4$ are independently hydrogen or a $C_1$–$C_{27}$ aryl, aralkyl, aliphatic, or cycloaliphatic group with the provisos that at least one of $R^2$, $R^3$, and $R^4$ must be hydrogen and that $R^2$, $R^3$, and $R^4$ cannot all be hydrogen, or
(B) $R^1$ and at least one of $R^2$, $R^3$, and $R^4$, as well as the carbon atoms to which they are attached, form at least one strained aliphatic ring, or
(C) $R^5$ is $(CR^2R^3)_m$ where m is 1 or 2 and $R^2$ and $R^3$ are independently hydrogen or a $C_1$–$C_{27}$ aryl, aralkyl, aliphatic, or cycloaliphatic group with the provisos that $R^2$ and $R^3$ cannot be hydrogen when m is 1 and that $R^2$ and $R^3$ cannot both be hydrogen when m is 2; and
(2) an effective amount of a catalyst system comprising a transition metal-containing species; and
b) allowing the monomer(s) to polymerize to a poly (olefin) film. This process is performed in an environment that is inert toward the above-described catalyst system. By "in-line" is meant a sequential, substantially continuous process whereby monomer-catalyst mixture is coated directly onto a substrate, preferably a moving substrate.

The process described above involves olefinic monomers whose polymerizations are mediated by a transition metal-containing species. The term "mediated by" means that the transition metal-containing species plays an integral role in the polymerization of the olefinic monomer(s). Common olefinic monomers that polymerize in this manner include α-olefins and ring-strained non-conjugated cyclic olefins.

The term "α-olefin" means a compound of the formula $H_2C=CHCR^2R^3R^4$ wherein $R^2$, $R^3$, and $R^4$ are independently hydrogen or a $C_1$–$C_{27}$ aryl, aralkyl, aliphatic, or cycloaliphatic group which can optionally contain one or more heteroatoms.

In another aspect, the present invention provides a composite article comprising paper, at least a portion of which is at least partially saturated by (1) a composition comprising a ring-strained cyclic olefinic monomer and a transition metal-containing compound or (2) the polymerization product of such a composition.

In yet another aspect, the present invention provides a method of making the above described composite article comprising the steps of at least partially saturating at least a portion of a paper with the above-described composition and allowing the monomer to polymerize.

Ring-strained non-conjugated cyclic olefin monomers undergo a ring opening metathesis polymerization (ROMP) that can be summarized as follows:

wherein

is a ring-strained non-conjugated cyclic olefin monomer and

illustrates the structure of the resultant ring-opened polymerized unit with n being from 5 to 100,000.

Common catalyst systems in which a transition metal-containing species plays an integral role in the polymerization of one or more olefinic monomers include ZN catalyst systems, metallocene systems, as well as inorganic compounds and organometallic complexes that comprise a metal from Periodic Group 4 to Group 10. Those skilled in the art will readily recognize which catalyst system(s) is/are useful with a given olefin or olefin combination.

The in-line process described above has several advantages over traditional means for making poly(olefin) composite structures. One is increased ease in handling and processing. Traditional methods call for the preparation and collection of poly(olefin) in a batch or continuous process and then solvent or hot melt coating the poly(olefin) onto a substrate with subsequent processing and curing. In the in-line process of the present invention, the need to solvent or hot melt coat the poly(olefin) in a separate step has been eliminated by providing for on-substrate polymerization of the monomer(s).

Another advantage of the in-line process described above is the reduction (or even elimination) of solvents from the composite structure preparation process. Many processes known in the art require solvent in either or both of the polymerization and coating steps. In the in-line process of the present invention, use of solvent is not required and, in some cases, can interfere with the efficient operation thereof.

A third advantage of the in-line process is that it allows for the formation of crosslinked or high molecular weight polyolefins. Post-polymerization processing of such polyolefins has been extremely difficult, if not impossible, to accomplish through extrusion, hot melt, or solvent coating processes, which are inefficient and/or tend to degrade the polymers. Because the polymer is prepared on the substrate in the in-line process of the present invention, a separate coating step and all the attendant problems involved are eliminated. Additionally, a crosslinking agent can be added directly to the monomer-catalyst mixture that is coated on the substrate.

Properties of the poly(olefin) materials produced by the process of the present invention vary depending on the monomer(s) and catalyst system used but are comparable to or better than those of poly(olefin) materials produced by conventional techniques. Commonly, however, these poly (olefins) are used as pressure-sensitive adhesives (PSAs), release (i.e., low adhesion) materials, and vibration damping materials.

The saturated paper of the present invention can be made much more conveniently than currently available saturated papers. Because no solvents are used in its production, the saturated paper of the present invention can be made more economically and in a more environmentally friendly manner. These saturated papers can be used as packaging materials, release liners, backings for adhesive constructions (e.g., PSA tapes), oil- or water-repellent papers, and the like.

DETAILED DESCRIPTION OF PREFERRED EMBODIMENTS

The in-line process of the present invention involves the use of one or more olefin monomers, having 30 or fewer carbon atoms, of the general formula

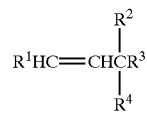

wherein (a) $R^1$ is hydrogen and $R^2$, $R^3$, and $R^4$ are independently hydrogen or a $C_1$–$C_{27}$ aryl, aralkyl, aliphatic, or cycloaliphatic group with the provisos that at least one of $R^2$, $R^3$, and $R^4$ must be hydrogen and that $R^2$, $R^3$, and $R^4$ cannot all be hydrogen, or (b) $R^1$ and one of $R^2$, $R^3$, and $R^4$, as well as the carbon atoms to which they are attached, form at least one strained aliphatic ring, or of the general formula

wherein $R^5$ is $(CR^2R^3)m$ where m is 1 or 2 and $R^2$ and $R^3$ are independently hydrogen or a $C_1$–$C_{27}$ aryl, aralkyl, aliphatic, or cycloaliphatic group with the provisos that $R^2$ and $R^3$ cannot be hydrogen when m is 1 and that $R^2$ and $R^3$ cannot both be hydrogen when m is 2. Such olefinic monomers include α-olefins and ring-strained non-conjugated cyclic olefins. Those skilled in the art will recognize which monomers (or combination thereof) provide a given desired property (e.g., a PSA composition or a release material).

The in-line process of the present invention involves the use of a monomer or mixture of monomers that is at least somewhat fluid or flowable at a temperature between about 15° and about 150° C., preferably between about 20° and 125° C., more preferably between about 20° and 100° C., most preferably between about 20° and 50° C. Where a solid monomer is to be included, it must be sufficiently soluble in the other liquids, preferably the other monomer(s), so as to form a homogeneous coatable mixture that can be applied to the substrate.

Where the monomer(s) comprise one or more α-olefins, at least one of the monomers will normally be a $C_5$–$C_{30}$ α-olefin, preferably a $C_6$–$C_{20}$ α-olefin, most preferably a $C_6$–$C_{12}$ α-olefin. Such an olefin can either be straight chain or branched (i.e., comprising one or more side chains). Common examples include 1-pentene, 1-hexene, 1-heptene, 1-octene, 1-nonene, 1-decene, 1-undecene, 1-dodecene, 1-hexadecene, 1-octadecene, 4-methyl-1-pentene, allyltrimethylsilane, and allylbenzene. These monomers can optionally be substituted with conventional substituents (i.e., those that do not interfere with the polymerization of, or the desired properties of the polymer produced from, these monomers). Blends of these monomers or one or more of these monomers plus a lower (i.e., $C_2$–$C_4$) 1-alkene are also within the scope of the present invention.

Ring-strained non-conjugated cyclic olefins useful in the in-line present invention include those described in U.S. Pat. No. 5,296,566, which list of monomers is incorporated herein by reference, and include monocyclic mono- and polyolefins and polycyclic mono- and polyolefins. These cyclic olefins can be substituted with up to four saturated or unsaturated hydrocarbyl, alkaryl, aralkyl or aryl groups, in which "alkyl" or "alk" or "hydrocarbyl" can be linear, branched or cyclic, each group containing up to 30 carbon atoms, up to sixty halogen atoms, and up to four heteroatoms selected from non-peroxidic O, N, and Si, which can be combined to form functional groups or linkages including ethers, alcohols, alkoxides, ketones, aldehydes, carboxylic acids, esters, amides, imides, amines, cyanides, anhydrides, organosilicons, organosilicones, oxysilanes, alkoxysilanes, and the like.

Preferred monocyclic monoolefins include substituted and unsubstituted cyclopropene, cyclobutene, cyclopentene, cycloheptene and cyclooctene. Preferred polycyclic monoolefins include substituted and unsubstituted norbornene and bicyclo[2.2.2]-oct-2-ene. Preferred polycyclic polyolefins include substituted and unsubstituted norbornadiene and dicyclopentadiene. In the cases of substituted norbornene and dicyclopentadiene, endo/exo, syn/anti, or combinations of any of these isomers are suitable. Examples of suitable monomers include 5-methyl-2-norbornene, 5-ethyl-2-norbornene, 7-methyl-2-norbornene, 1-methyl-2-norbornene, 5,6-dimethyl-2-norbornene, 5-norbornene-2-carbonitrile, 5-norbornene-2-carboxaldehyde, 5-norbornene-2,3-dicarboxylic acid, diethyl 5-norbornene-2,3-dicarboxylate, dimethyl 5-norbornene-2,3-dicarboxylate, 5-norbornene-2,3-dicarboxylic anhydride, 5-norbornene-2,2-dimethanol, 5-norbornene-2-methanol-5-norbornen-2-ol, 2-acetyl-5-norbornene, 5-norbornen-2-yl acetate, 2-benzoyl-5-norbornene, 5-vinyl-2-norbornene, 5-methylene-2-norbornene, 5-norbornene-2-methanol acrylate, 5-[2-(trimethyl-silyl)ethyl]-2-norbornene, 5-[2-(pentamethyldisiloxyl)ethyl]-2-norbornene, 5-chloromethyl-2-norbornene, 2,3-di(chloromethyl)-5-norbornene, 5-trifluoro-methyl-2-norbornene, and 2,3,3-trifluoro-2-trifluoromethyl-5-norbor-nene. Other suitable monomers are described in U.S. Pat. Nos. 5,011,730, 4,994, 535, 4,945,144, 4,943,621, 4,923,943, 4,923,936, and 4,250, 063, each of which is incorporated herein by reference. All these materials are commercially available (e.g., Aldrich Chemical Co.; Milwaukee, Wis.) or can be prepared as described in the chemical literature with the possible exception of 5-[2-(trimethylsilyl)ethyl]-2-norbornene and 5-[2-(pentamethyldisiloxy)ethyl]-2-norbornene which are prepared by the reaction of 5-vinyl-2-norbornene with trimethylsilane or pentamethyldisiloxane, respectively, in the presence of Pt-containing catalysts using published procedures for the hydrosilation of alkenes (see D. A. Armitage, "Organosilanes," *Comprehensive Organometallic Chemistry*, vol. 2, 117–20, Pergamon Press, Oxford (1982)). Preferably, at least one of the cyclic olefins of the present invention is polycyclic, more preferably substituted norbornene or substituted or unsubstituted dicyclopentadiene.

Catalysts that can be used in the process of the present invention include those systems that comprise a transition metal-containing species. Where at least one of the olefinic monomers is an α-olefin, useful catalysts include metallocenes and ZN systems. By "ZN systems" is meant the combination of certain transition metal compounds (commonly halides) with alkyl, aryl, or hydride derivatives of metals from Periodic Groups 1–5, particularly Groups 4 and 5, in an inert solvent or diluent and under inert conditions. Among the most preferred ZN systems is $TiCl_3$ (optionally supported on an inert material such as $MgCl_2$ or polypropylene) combined with an aluminum alkyl such as $Al(C_2H_5)_3$. Such a system optionally can be introduced as a slurry or suspension in an inert solvent such as toluene or heptane. Those skilled in the art will readily recognize other useful ZN systems. With respect to metallocene systems, particularly useful metal containing compounds include those that comprise Ti, Zr, Hf, or V. An example of such a system is $(C_{13}H_9)Zr(CH_3)_2$ combined with either $C_{18}H_{37}OH$, $B(C_6F_5)_3$ or methylaluminoxane. Metallocene catalyst systems commonly are added to the monomer(s) as a solution in an aromatic solvent such as toluene or xylene.

Where at least one of the olefinic monomers is a ring-strained non-conjugated cyclic olefin, useful catalysts include Periodic Groups 4–10 transition metal compounds and complexes, particularly those that comprise at least one of Mo, W, Ru, Os, Ti, Re, and Ir. Although heterogeneous catalysts can be used, homogeneous ones are preferred. Cocatalysts can be used in combination with certain transition metal-containing species. Traditional catalysts include compounds having one or more alkyl groups bonded to a non-transition metal (i.e., those from Periodic Groups 1–2 and 12–14), although some recently described catalysts can be used with Lewis acids, oxidizing agents, silanes, heteroatom-containing olefins, and alkynes. Although well known air- and water-sensitive catalysts can be used, those that are air and moisture stable are preferred. One- and two-part catalysts that are air- and moisture-stable are more fully described in the Background, Summary, and Detailed Description sections of the previously-incorporated U.S. Pat. No. 5,296,566.

As those skilled in the art will recognize from this discussion, the in-line process of the present invention is not limited by a particular catalyst or catalyst system. The identity of the catalyst is unimportant as long as it effects the polymerization of the monomer(s) being used.

Those skilled in the art will also recognize that keeping the concentration of catalyst as low as possible is desirable so as not to degrade the performance characteristics of the resultant polymer. Effective concentrations will vary depending on the particular catalyst system used, and those skilled in the art will recognize useful concentrations for a given polymerization.

Many of the above-described catalysts are sensitive to a variety of substances including, particularly, water and oxygen. For example, both ZN and metallocene systems are very sensitive to both water and oxygen. When one of these or another sensitive catalyst systems is used, the in-line process of the present invention provides for the substantial exclusion of the catalyst-quenching materials. The particulars of how this exclusion is accomplished is more fully detailed below in the description of the process below.

Where the monomer is one or more ring-strained nonconjugated cyclic olefins and the catalyst used is not sensitive to, for example, active hydrogen-containing compounds, an antioxidant can be included in the polymerizable mixture. Antioxidants are useful in inhibiting degradation of the resultant polymers. Adding antioxidant to the polymerizable mixture eliminates the need for an additional processing step in which antioxidant is subsequently added to the polymer. Useful antioxidants include, but are not limited to, hindered phenols, hindered amines, and triazines. Where such an antioxidant is used, it preferably makes up 0.01% to 5% (by weight) of the mixture.

The in-line process of the present invention can be performed essentially solvent-free. Some solvent, such as that used to introduce the catalyst into the mixture (e.g., a solution, slurry, or suspension) might be present. Costly and complicated post-polymerization processing steps can be avoided by eliminating or substantially reducing the amount of solvent used. This advantage should not be considered limiting, however. If the presence of solvent were deemed to be advantageous for a given polymerization (e.g., dissipation of heat or modification of polymerization rate), the process of the present invention allows for the presence of such a solvent.

A significant advantage provided by the in-line process of the present invention is the ability to include a crosslinking agent directly in the monomer(s) or the polymerizing mixture. Accordingly, an article coated with a layer of a crosslinked polymer can be obtained conveniently. Depending on the monomer(s) and catalyst system chosen, many crosslinking agents are potentially useful. However, preferred crosslinking agents include organic compounds comprising two or more unsubstituted, terminal olefinic groups wherein the olefinic groups are separated by at least three carbon atoms (e.g., 1,13-tetradecadiene and 1,7-octadiene) and organic compounds comprising two or more non-conjugated ring strained cyclic olefinic groups (e.g., dicyclopentadiene and a,w-di(5-norbornene-2-yl)alkenes).

Other adjuvants can be present in the mixtures that undergo the in-line process of the present invention. Common adjuvants that can be used include, but are not limited to, plasticizers, tackifiers, oils, polyenes, oligomers and/or polymers (including rubber and elastomers), viscosifiers, chain transfer agents, and fillers. Regardless of type or identity, any adjuvant used must not deactivate the transition metal-containing catalyst system. For example, where a ZN system is used to catalyze an α-olefin polymerization, the presence of an adjuvant that contains an active hydrogen atom would be counterproductive.

The in-line process of the present invention involves two steps: coating and polymerization. Normally, a substrate used in the in-line process of the present invention will be coated with a polymerizing mixture. By "polymerizing mixture" is meant one that is in the process of polymerizing as it is being coated. This on-going polymerization is a result of the catalyst system and monomer(s) being admixed prior to being applied to the substrate. The reason for this preliminary admixing is to uniformly disperse the catalyst system throughout the monomer. This catalyst-monomer mixing results in the initiation of polymerization which, in turn, increases the viscosity of the mixture and allows it to be more easily coated.

The polymerizing mixture is preferably substantially chemically and physically non-reactive toward the substrate.

Preferred substrates for the in-line process of the present invention include tape backings and continuous belts. Typical tape backings include cellulosic materials such as paper, creped paper, and cloth; films such as biaxially oriented polyester or biaxially and monoaxially oriented polypropylene; nylon; and metal foils such as aluminum foil. The back side of the backings can be treated with a release coating such as silicone. Backings can be treated prior to being coated to enhance the adhesion thereto.

Coating a substrate with neat monomer(s) while providing a means to prevent the monomer(s) from running off the substrate is also possible. For example, two barriers, preferably perpendicular to the substrate, could be provided that confine the monomer(s) to the substrate during processing and polymerization. Alternatively, application of a viscosifier-containing monomer mixture to a substrate with the subsequent addition of catalyst is also possible. Those skilled in the art will recognize numerous other means for keeping neat monomer(s) on a substrate; nevertheless, coating a substrate with a polymerizing mixture is preferred in the in-line process of the present invention.

Once a substrate has been coated with the above-described mixture, the monomer(s) in that mixture are allowed to continue polymerizing. Advantageously, olefinic monomers useful in the in-line process of the present invention (i.e., those whose polymerization is mediated by a transition metal species) often polymerize at or near room temperature. However, where desired, the temperature at which the in-line process is carried out can be varied. For example, where reduction of the rate of a given polymerization or the production of a narrow molecular weight distribution is desired, the in-line process can be carried out at a reduced temperature (i.e., from about 0° C. up to about 15° C.). Alternatively, where a fast polymerization or a polymer with a lower molecular weight is desired, the process can be carried out at an elevated temperature. The temperature profile for the polymerization (including starting and ending temperatures as well as any temperature ramping) is preferably selected to minimize volatilization of monomers. (Although temperatures up to 1 50° C. are potentially useful, temperatures between about 20° and 125° C. are preferred, temperatures between about 20° and 100° C. are more preferred, and temperatures between about 20° and 50° C. are most preferred.) Once the mixture has substantially polymerized, the coated substrate can be subjected to conditions (i.e., temperature, pressure, or a combination thereof) that will volatilize unreacted monomer from the polymer-coated substrate.

Useful monomers and catalysts have been described previously. Some of these catalysts or catalyst systems are sensitive to oxygen, water, active-hydrogen-containing compounds, and a variety of other chemical species. Where such a sensitive catalyst is used, the in-line process of the present invention must be carried in an environment that is inert toward that catalyst. (Where the catalyst used is oxygen- and water-stable, open air would be considered an environment that is inert toward that catalyst system.) In other words, those chemical species that can deactivate the catalyst must be excluded from the process. This exclusion can be accomplished in a variety of ways. One such method is to carry out the process in an atmosphere that is substantially free of those chemical species that are not inert toward the catalyst system. A convenient way to attain such an atmosphere is to purge the area in which the in-line process is being performed with an inert gas (e.g., nitrogen or a noble gas). Where a purge is inconvenient or impractical, the coated mixture can be covered with barrier layer that is substantially impermeable to the chemical species that are not inert toward the catalyst system. When such a barrier layer is used, the substrate is also substantially impermeable to the deactivating chemical species. In such a dual barrier layer arrangement, the substrate can be made of the same or different material as the top barrier layer. In a preferred embodiment, the substrate and the barrier layer exhibit differential adhesion to the polymer formed from the coated mixture.

This barrier layer, whether it covers the coated mixture, acts as the substrate therefor, or both, is preferably substantially chemically and physically non-reactive toward the coated mixture. In other words, the mixture preferably does not react with or sorb to the barrier layer. Materials that can be used as barrier layers include polymers; metals; and fibrillar webs (e.g., fibrillated polytetrafluoroethylene, paper, etc.) impregnated with, coated with, or having adhesively adhered thereto one or more polymer films. Preferred films are based on polypropylene, polyethylene, polytetrafluoroethylene, polyethylene terephthalate, polybutadiene, polyvinylchloride, polyvinylidenechloride, cellulose acetate, and the like.

Reinforced poly(olefin) compositions also can be obtained from the in-line process of the present invention. A reinforcing matrix (e.g., a nonwoven web, scrim, etc.) can be placed on a substrate and coated or saturated with the polymerizing mixture.

Poly(olefins) exhibiting a z-axis (i.e., top to bottom) compositional gradient or differential can be prepared according to the process of the present invention. A useful environment in which to produce such a poly(olefin) is an atmosphere comprised (at least) in part of a purified lower 1-alkene (i.e., a gaseous monomer). Preferred among such 1-alkenes are ethylene and propylene, particularly ethylene. By "purified" is meant that potential catalyst-destroying materials have been substantially eliminated. When this is done, the lower 1-alkene has been found to diffuse into the coated mixture. (The lower 1-alkene can be added to the coated mixture in other ways, but it preferably is added at some point after the mixture has been coated on the substrate.) Lower 1-alkenes tend to polymerize much more rapidly than higher α-olefins under similar circumstances. Accordingly, the upper portion of the coating becomes enriched, relative to the remainder of the coating, in the polymer derived from the lower 1-alkene. This leads to a compositional gradient or differential through the thickness of the polymer. The profile of such a gradient will depend on a variety of factors including the concentration of the lower 1-alkene in the atmosphere, the polymerization temperature, and the viscosity of the coating at the time the lower 1-alkene is introduced.

Polymers derived from lower 1-alkenes are crystalline and are not tacky, whereas polymers derived from higher α-olefins are not crystalline and exhibit pronounced tack. Where a coating comprises an upper layer that includes a higher concentration of 1-alkene (e.g., polyethylene) and the remainder includes a higher concentration of a polyolefin (e.g., polyoctene), the coating can display graded or differential tack. Gradients or differentials in other physical, chemical, and/or mechanical properties are also possible depending on the combination of monomers used. A polymeric coating that exhibits graded or differential tack can be useful as, for example, an adhesive tape or a protective coating.

Once the mixture (regardless of the particular monomer(s) used and the presence or absence of adjuvants) has substantially completely polymerized, the substrate, upper barrier layer (when present), or both can be removed to provide a self-supporting polymer film or laminate construction. Such films and laminates are potentially useful as release materials, PSAs, heat-activated adhesives, vibration damping materials, transfer adhesives, structural adhesives, and protective coatings.

Composite, polymer-saturated paper articles can be prepared by providing a paper support that is at least partially saturated with a polymerizable composition comprising at least one ring-strained cyclic olefin, a transition metal-containing catalyst compound and, optionally, a cocatalyst and then allowing that composition to polymerize. These composite articles can be used as packaging materials, release liners, backings for adhesive constructions (e.g., PSA tapes), oil- and water-repellent papers, and the like.

The paper support can be coated on one surface thereof prior to being saturated with the polymerizable composition of the invention. Thus, for example, a silicone-coated paper can be further treated on its uncoated side with a polymerizable composition comprising a ring-strained olefin, a transition-metal catalyst, and, optionally, a cocatalyst, after which the ring-strained olefin is caused to polymerize. This can provide a paper support that has different coatings on each side.

Alternatively, a composite, polymer-saturated paper article can be prepared by means described above and, subsequently, one or more functional or decorative coatings can be applied to either or both sides of the polymer-saturated paper. The additional coatings can comprise functional materials including, but not limited to, photoimagable, adhesive, abhesive, or protective coatings; or decorative materials, such as dyes or pigments and patterns thereof.

Many varieties of paper that vary in color, weight, porosity, and/or post-treatments (e.g., sizing or coating) are commercially available. All of these are suitable as supports for the polymerizable compositions of this invention and are within the scope of this invention. However, the paper preferably does not contain substantial amounts of sulfur (as sterically unhindered sulfide or thiol), as might be added in post-treatment processing. Such sulfur can deactivate the transition metal-containing catalyst. Nevertheless, sulfur-containing paper can be used as the support as long as the moles of "free" sulfur contained therein is not equal to or greater than the moles of catalyst in the polymerizable composition. (A "polymerizable composition" comprises a ring-strained cyclic olefin monomer and a transition metal-containing catalyst, and has been described previously.)

Among potentially useful monomers, norbornene substituted with at least one group is preferred. Especially preferred is 2-norbornene substituted in the 5-position (endow, exo-, or any combination thereof) with a $C_4$–$C_{20}$ alkyl group, an organosilicon group containing 1 to 300 Si and 0 to 300 oxygen atoms, and/or a fluorocarbon group containing from 1 to 16 carbon atoms.

The properties of norbornene polymers can be tailored to meet specific needs for a variety of applications by the use of variously-substituted norbornene monomers, wherein the nature of the substituent on the norbornene ring controls or affects the properties of the polymer. For example, alkyl-norbornenes such as 5-hexyl-2-norbornene can be polymerized to give rubbery polymers. When an alkylnorbornene is applied to paper and polymerized, the resulting paper construction can be used where there is a need for flexibility, elongation, improved strength, and water resistance such as, for example, saturated paper for tape backings. Norbornenes with silicone substituents can yield polymers that show weak adhesion to materials such as PSA and thus can be used to saturate papers to produce constructions useful as release liners. Norbornenes bearing fluorocarbon substituents can provide polymers that are impermeable to oil and thus can be used to saturate papers to give constructions useful in the packaging of oily materials such as certain foods. The specific examples cited here are not intended to unduly limit the scope of this invention.

Paper-saturating or -supported polymerizable compositions of the present invention can be prepared by bringing the paper into contact with a mixture comprising one or more ring-strained cyclic olefin monomers and a transition metal-containing catalyst by any of a number of methods including dipping, wicking, coating with a roller or blade, spraying and the like. Preferably, the polymerizable composition is, or can be converted into, a liquid. Accordingly, the monomer is preferably a liquid monomer, a melted monomer (in the case of monomer which is solid at room temperature, that is, the monomer is warmed to provide a liquid), a eutectic mixture of monomers, or a solution, suspension, or emulsion of monomer. Optionally, adjuvants such as solvents, polymers, tackifiers, antioxidants, pigments, and the like can be included. (See also the discussion of adjuvants in the discussion of the in-line process, supra.) Commonly used solvents, such as THF, acetone, MEK, or toluene can inhibit polymerization and, accordingly, can be employed as volatile polymerization inhibitors.

A paper can be fully or partially saturated with monomer prior to polymerization. Such saturation can be quantified by two parameters: the ratio of the weight of monomer or polymer to the weight of paper or the depth to which the monomer or polymer has penetrated into the paper from the side or sides on which it was initially coated. Typically, the weight ratio of polymer to paper is in the range of 0.1 to 10, preferably 0.2 to 3. The depth of penetration can be 1 to 100% of the total thickness of the paper. These parameters are controlled by factors such as the capacity for the monomer(s) to wet the paper fibers; the capacity of the paper fibers to be wetted; the viscosity of the monomer solution; the presence of solvents, additives, wetting agents, etc.; coating thickness; temperature; and many other process variables. Partially polymerized compositions can be used, particularly if a higher viscosity composition is desired for coating. In practice, the mixture of monomer(s) and catalyst often begins to polymerize upon mixing, and may contain at least a small amount of polymer during the coating operation.

The paper-supported polymerizable composition can then be caused to polymerize. Polymerization can occur in ambient conditions or can be accelerated by, for example, the application of heat, irradiation with actinic radiation (e.g., UV light), and/or the evaporation of solvent and/or inhibitor. Any monomer used is preferably sufficiently non-volatile that substantial quantities thereof are retained in and polymerized in or on the paper support during the polymerization step.

Where a catalyst that is not air stable is used, the composite article is preferably protected from the air. This can be accomplished by performing the contacting and polymerization steps in an inert atmosphere or by providing a barrier layer that is substantially impermeable to air. For further discussion of use of barrier layers, see the discussion of the in-line process, supra.

Essentially complete conversion of monomer to polymer can occur, and is preferred. However, variations are also within the scope of this invention and will be apparent to those skilled in the art. For example, residual unreacted monomer can be removed in a subsequent step, such as in a chamber or zone having high temperature, low pressure, or good exchange of atmosphere.

Objects and advantages of this invention are further illustrated by the following examples. The particular materials and amounts thereof, as well as other conditions and details, recited in these examples should not be used to unduly limit this invention.

EXAMPLES

Example 1

A catalyst solution such as is described in Example 25 of U.S. Pat. No. 5,296,433, the teaching of which is incorporated herein by reference, was prepared in a dry box under a nitrogen atmosphere by adding a solution of 0.013 g tris(pentafluorophenyl)boron and 0.007 g octadecanol in 1 ml dry toluene to a solution of 0.012 g bis(fluorenyl) zirconium dimethyl. The catalyst solution was added to 40.0 g 1-hexene (Aldrich Chem. Co.), in a dry box under a nitrogen atmosphere, and the reaction mixture stirred for approximately one hour, during which time the viscosity of the mixture advanced to a syrup-like consistency.

An aliquot of this polymerizing mixture was coated on a polypropylene sheet with a stirring rod to form a film with a thickness of approximately 0.13 mm. The film was covered with an inverted glass dish to retard monomer evaporation and allowed to polymerize at ambient conditions in the dry box. After approximately 13 hours, the 1-hexene had polymerized to a continuous film of an adhesive-like polymer.

A second aliquot of the polymerizing mixture was transferred to a glass dish, spread out to form a thin film, covered with an inverted glass dish and allowed to polymerize under ambient conditions in the dry box. After approximately 13 hours, the coated dish was removed from the dry box, and a piece of filter paper was pressed onto the tacky film. The filter paper displayed sufficient adhesion to the polymer film to support the weight of the dish. Gel permeation chromatography (GPC), using polystyrene standards, of the polymer indicated that it had a weight average molecular weight ($M_w$) of $2.0 \times 10^6$.

This example illustrates the on-substrate polymerization of a liquid olefin monomer using a soluble, homogeneous catalyst.

Example 2

A ZN catalyst was prepared in a dry box under a nitrogen atmosphere by slurrying in mineral oil $TiCl_3$ supported on $MgCl_2$, commercially available as LYNX 1000 catalyst (Catalyst Resources, Inc.; Houston, Tex.), to produce a uniform suspension containing 1.26 mg Ti/ml. To 5 ml heptane containing 0.27 ml of a 1M solution of triethylaluminum (Ethyl Corp.; Baton Rouge, La.) was added 0.5 ml of the $TiCl_3$ suspension. This mixture was stirred for approximately one minute.

In a dry box, 1.5 ml of the activated catalyst suspension was added with stirring to 35.7 g 1-octene (Aldrich Chem. Co.). The resulting mixture was stirred until it had a syrup-like consistency (approximately 3 minutes) at which time aliquot portions of the polymerizing mixture were coated on polypropylene sheets with a stirring rod to a thickness of approximately 2 mm. The coated films were covered with inverted glass dishes to retard monomer evaporation and allowed to polymerize under ambient conditions in the dry box for approximately 12 hours. The resulting adherent polyoctene films displayed adhesive-like properties.

This example illustrates the use of a heterogeneous catalyst for the on-substrate polymerization of a liquid olefin monomer.

Example 3

A solution of 36 g 1-octene and 9 g REGALREZ 1085 hydrogenated tackifier (Hercules Corp.; Wilmington, Del.) was polymerized in a dry box under a nitrogen atmosphere by adding, with stirring, 2 ml of the ZN catalyst suspension described in Example 2. The resulting mixture advanced to a syrup-like consistency in approximately 8 minutes, at which time aliquot portions of the mixture were transferred to two polyproplyene sheets, one having a smooth surface and the other having a roughened texture. Each sheet was coated with an aliquot portion of the mixture using a stirring rod to produce an approximately 2 mm thick film. The coated sheets were covered with inverted glass dishes to retard monomer evaporation and allowed to polymerize under ambient conditions in the dry box for approximately 12 hours. Unreacted monomer was removed by placing the polymer-coated sheets in a vacuum chamber and maintained at a pressure of 3.3 kPa (25 mm Hg) for about 8 hours. The resulting adherent plasticized polyoctene films displayed adhesive-like properties.

This example illustrates the on-substrate polymerization of a liquid olefin monomer that has been combined with a tackifier to lower the glass transition temperature of the resulting polymer.

Example 4

A plasticized polyoctene film was prepared according to the procedure of Example 3 except that 0.084 g 1,13-tetradecadiene (Aldrich) was added to the polymerizing mixture. Adherent plasticized, lightly cross-linked polyoctene films displaying adhesive-like properties were produced after approximately 12 hours polymerization under ambient conditions in the dry box. Excess polymerization mixture kept in a sealed bottle in the dry box for the same time period polymerized to 86% conversion.

This example illustrates the polymerization of a liquid olefin monomer that has been combined with a tackifier and a crosslinking agent. Polymers produced from such mixtures typically exhibit excellent shear properties.

Example 5

A solution of 5.97 g KRATON 1657G styrene/ethylene-butylene copolymer (Shell Oil Company; Houston, Tex.) and 15.0 g REGALREZ 1085 tackifier in 35.7 g 1-octene containing 0.2 ml of a 1M solution of triethyl aluminum in hexane was polymerized in a dry box under a nitrogen atmosphere according to the procedure described in Example 3 utilizing 2 ml of the ZN catalyst suspension described in that example. The polymerizing mixture was vigorously stirred for approximately one minute prior to coating on polypropylene sheet and then allowed to polymerize under ambient conditions in the dry box for approximately 12 hours. A tough, tacky, adhesive-like film on the polypropylene sheet was produced. Transmission electron microscopic examination of a thin section of the polymerized film revealed large, irregular areas of KRATON copolymer that were tens of microns in size.

Excess polymerization mixture kept in a sealed bottle in the dry box for the same time period polymerized to 98% conversion.

This example illustrates the on-substrate polymerization of a liquid olefin monomer in conjunction with the addition of a second polymer phase to act as a reinforcing component.

Example 6

A ZN catalyst was prepared according to the procedure of Example 2 by adding 1.5 ml of the precursor-in-mineral oil to 5 ml heptane containing 0.74 ml of 1M triethylaluminum in hexane. The resulting suspension was stored in a tightly sealed bottle. A solution of 35 g REGALREZ 1085 tackifier in 71.5 g 1-octene was also prepared in a dry box under a dry nitrogen atmosphere and stored in a tightly sealed bottle. Both bottles were transferred to a nitrogen-purged coater having an oxygen content of approximately 8 ppm, the catalyst suspension added to the tackifier/octene solution, and the resulting mixture stirred for approximately 2 minutes during which time the mixture acquired a syrup-like consistency. The polymerizing mixture was coated onto a polypropylene sheet to an approximate thickness of 0.13 mm. The coated sheet was immediately covered with a release coated polypropylene film, the silicone release coating being in contact with the polymerizing mixture. Approximately 11 m of a 15.2 cm wide trilayer laminate was maintained under a nitrogen atmosphere for approximately 8 minutes before exiting the nitrogen purged coater apparatus and being wound on a takeup roll.

A layer of adhesive material covered each film when the laminate construction was separated. The force required to separate the laminate construction increased with time, indicating that polymerization of the tackifier/octene solution continued after the trilayer laminate exited the nitrogen purged coater apparatus. Polymerization of the tackifier/octene solution in the trilayer laminate construction was accelerated by placing sections of the laminate in an air circulating oven at approximately 65° C. for about 5 minutes.

Example 7

A trilayer laminate of a tackified, lightly crosslinked polyoctene adhesive composition between two polypropylene films was prepared according to the general procedure of Example 6 except that the catalyst/monomer mixture was prepared in the antechamber of the nitrogen-purged coating apparatus. A catalyst/monomer mixture was prepared by adding 1.5 ml catalyst precursor suspension in mineral oil to 71.5 g 1-octene containing 20 g REGALREZ 1085 tackifier, 0.1 g 1,13-tetradecadiene, and 1.5 ml 1M triethylaluminum in hexane. The resulting mixture was stirred for approximately 3 minutes before being transferred to the coater where a layer of the polymerizing mixture having a thickness of approximately 0.13 mm was coated between two polypropylene sheets. That the polymerization of the tackifier/octene/tetra-decadiene solution continued after the trilayer laminate exited the nitrogen-purged coater apparatus was evidenced by the fact that the force required to separate the laminate construction increased with time.

Example 8

A 4.5 ml portion of the active ZN catalyst described in Example 2 was added to 37.5 g 1-octene. The resulting mixture was stirred for approximately 3.5 minutes, and an approximately 2 mm thick coating of the polymerizing mixture was applied to the silicone release-coated side of a 0.05 mm thick poly(ethylene terephthalate) sheet. The coated film was placed in the bottom of a glass dish covered with a lid fitted with an inlet tube that terminated in a series of downwardly directed nozzles and a vent tube. The inlet tube was connected to a ethylene tank having a valve adjusted to maintain a low volume flow of ethylene gas, thereby creating an ethylene rich atmosphere in the covered dish. The ethylene flow was discontinued after approximately 5 seconds, and the coating was allowed to polymerize in the ethylene enriched nitrogen atmosphere for approximately 12 hours at ambient temperature and pressure.

Residual monomer and solvent were volatilized from the polymerized film by placing the film under vacuum. The film was placed between two silicone-coated release liners and two strips measuring 2.5 cm 12.5 cm were cut therefrom. The release liners were removed and each strip was laminated to the adhesive side of a strip of SCOTCH 8403 tape (3M; St. Paul, Minn.) such that the ethylene-rich surface was exposed on one strip and the octene-rich surface (i.e., the surface adjacent to the release coating during polymerization) was exposed on the other strip. Each strip was laminated to a glass plate secured to an I-MASS peel tester (Instrumentors, Inc.; Strongsville, Ohio) and subjected to 180° peel testing at a rate of 25 cm/min. The peel strength of the ethylene-rich surface was 1.1 N/dm while the peel strength of the octene-rich surface was 31.0 N/dm.

This example illustrates the on-substrate polymerization of a liquid olefin monomer in the presence of a gaseous olefin comonomer to produce a poly(olefin) exhibiting graded tack.

Example 9

A ZN catalyst suspension prepared as described in Example 2 was injected into a stirred solution of 23.7 g 1-octadecene (Aldrich Chem. Co.) and 21 g 1-octene containing 0.2 ml 1 M triethylaluminum (in hexane) in a dry box under a nitrogen atmosphere. The resulting mixture was stirred for approximately 4 minutes and then coated on a flat polypropylene sheet to form a thin film. The film was kept in the dry box for approximately 6 hours at 45° C. to produce a smooth, non-sticky, almost waxy film. SCOTCH MAGIC MENDING tape (3M) would not adhere to the polymerized coating.

This example illustrates the on-substrate polymerization of a liquid olefin monomer in conjunction with another liquid olefin comonomer to produce a polymer having release surface-like properties and the use of heat to accelerate the polymerization reaction.

Example 10

5-hexyl-2-norbornene (i.e., 5-hexyl-bicyclo[2.2.1]hept-2-ene, or HNB), 5-butyl-2-norbornene (5-butyl-bicyclo[2.2.1]hept-2-ene, or BNB), and 5-octyl-2-norbornene (5-octyl-bicyclo[2.2.1]hept-2-ene, or ONB) were prepared as described in U.S. Pat. No. 3,546,183, the teaching of which is incorporated herein by reference. In all preparations, the indicated compounds were distilled from the reaction mixture to obtain a mixture of endo and exo alkyl substituted norbornene isomers. The distillation products contained varying amounts of $Cp_2$ and $Cp_3$, as indicated by gas chromatography of the distillates and noted in subsequent examples.

Throughout these examples, $[N(SO_2CF_3)_2]^-$ is referred to as (DSN). Li(DSN) is available under the trade name "HQ115" from 3M Specialty Chemicals Division (St. Paul, Minn.). H(DSN) can be prepared by adding Li(DSN) to 96% analytical reagent-grade sulfuric acid, followed by distillation at reduced pressure. To prepare $Zn(DSN)_2$, 20.0 g distilled H(DSN) was added slowly to a stirred slurry of 4.46 g zinc carbonate in 50 g deibnized water. The final pH was 7–8. The mixture was filtered to remove any unreacted zinc carbonate and the clear filtrate was concentrated to yield a white crystalline salt, $Zn(DSN)_2$.

The above-described monomers were polymerized by adding catalyst solution (prepared by dissolving iridium catalyst, optional cocatalyst, and optional stabilizer in tetrahydrofuran (THF)) to the monomers indicated in Table 1. The resulting mixtures were poured into open-faced metal pans to a depth of 0.4 to 1.7 mm, placed in an oven at 90° C. and allowed to polymerize. After about two minutes (depending on catalyst level, shorter times for higher catalyst levels), a free standing film could be lifted from the pan. Samples were kept at 90° C. for 3 to 5 minutes.

TABLE 1

Alkyl Norbornene Polymerizations

| Sample Number | Monomer | Crosslinker[1] | Ir Compound (mg per g monomer) |
|---|---|---|---|
| 13a | HNB | 0 | 4.2[2] |
| 13b | ONB | 3.9% $Cp_3$ | 7.1[3] |
| 13c | HNB/ONB (95/5 wt. %) | 0.20% $Cp_3$ | 3.4[3] |
| 13d | BNB | 9.12% $Cp_2$ | 4.8[3] |
| 13e[4] | HNB | 0.5% $Cp_3$ | 8.6[5] |

[1]Crosslinker levels of $Cp_2$ or $Cp_3$ present in alkyl norbornene. Detection limits are 0.05% or better, and impurity levels are expressed as integrated area percentages based on flame ionization detection.
[2]40.4 mg $[Ir(cyclooctene)_2Cl]_2$, 51.8 mg $Zn(DSN)_2$, and 103.2 mg IRGANOX 1010 antioxidant (Ciba-Geigy Corp.; Hawthorne NY) dissolved in 4.45 g THF.
[3]40.0 mg $[Ir(cyclooctene)_2Cl]_2$, 41.4 mg $Zn(DSN)_2$ and 83.9 mg IRGANOX 1010 antioxidant dissolved in 4.45 g THF.
[4]Polymerized at 115° C. for 1.25 minutes.
[5]33 mg $[Ir(cyclooctadiene)Cl]_2$, 30 mg Zn(triflate), 63 mg IRGANOX 1010 antioxidant in 3.83 g HNB with no added solvent.

Samples 13b, 13c, and 13e formed crosslinked polymer gels that could not be dissolved in toluene, while sample 13d dissolved partially. GPC, using polystyrene standards, of film 13a indicated a number average molecular weight ($M_n$) of $3.20 \times 10^5$ and a $M_w$ of $9.02 \times 10^5$.

The data of Table 1 demonstrate the on-substrate polymerization of alkyl norbornene monomers in air with different catalysts and cocatalysts, optionally in the presence of crosslinkers.

Example 11

Two samples of 5-hexyl-2-norbornene containing 0.5% $Cp_3$ with different levels of tackifying additive, as indicated in Table 2, were prepared. A catalyst solution of 23 mg $[Ir(cyclooctadiene)Cl]_2$, 33 mg $Zn(DSN)_2$, and 269 mg IRGANOX 1010 antioxidant in 2.2 g THF was added to each sample, and the mixtures knife-coated onto 0.036 mm (1.4 mil) polyester backing at a thickness of 3 mil. Samples were cured in an oven at the times and temperatures indicated to give tacky adhesive materials. Peel force (at 180°) was measured as the amount of weight required to pull a 1-inch piece of tape at about 229 cm/min (90 in/min).

TABLE 2

Alkylnorbornene/Tackifier Polymerizations

| Sample | HNB (g) | Tackifier Type/Weight (g) | Cure (° C./min) | Peel[1] (g/cm) |
|---|---|---|---|---|
| 14a | 10.55 | REGALREZ 1126[2]/3.51 | 102° C./1.0 | 110 |
| 14b | 7.97 | REGALREZ 1126/2.65 plus Indopol H 1500[3]/3.36 | 116° C./2.0 | 550–1100 |

[1]Peel was somewhat shocky and some adhesive transfer was observed.
[2]A $C_5$ resin tackifier (Hercules Chemical Co.; Wilmington, DE).
[3]A polybutene tackifier (Amoco Chemical Co.; Chicago, IL).

This example demonstrates the polymerization of a ring-strained olefin in the presence of tackifying additives to produce a pressure sensitive adhesive.

Example 12

A series of samples containing 55.0 g 5-hexyl-2-norbornene, containing no crosslinker, and catalyst solution (1.9 mg [Ir(cyclooctene)$_2$Cl]$_2$ dissolved in 0.5 gm CH$_2$Cl$_2$) and 0.5 g of the solvents indicated in Table 3 were prepared. Each sample was mixed to obtain a homogeneous mixture, promptly poured into open faced metal pans (film thickness about 0.7 mm, including solvent) and immediately heated in a 90° C. oven. The rates of polymerization for each composition, as determined by inspection, are indicated in Table 3. Film thickness upon solvent evaporation and completion of polymerization was approximately 0.2 mm.

TABLE 3

Solvent Retarded Polymerization

| Sample | Solvent | Cure Time (sec) | | | | | Other |
|---|---|---|---|---|---|---|---|
| | | 20 | 40 | 60 | 120 | 180 | |
| 12a | CH$_2$Cl$_2$ | 1 | 2 | 3 | 4 | | |
| 12b | THF | 0 | 1 | 2 | 3 | 4 | |
| 12c | toluene | 1 | 2 | 3 | 3 | 3 | 4 at 270 sec |
| 12d | acetone | 0 | 1 | 2 | 3 | 4 | |
| 12e | MEK | 0 | 1 | 1 | 2 | 3 | 4 at 270 sec |

The degree of cure of the reaction mixture was defined according to the following scale:

1=more viscous solution than the monomer solution;

2=liquid having sufficient viscosity to leave a line trace when a stick was pulled through the solution;

3=soft solid; and

4=free standing film that could be removed from the pan.

In these samples the polymerization rates increased as solvent evaporated from the samples. In similar samples kept in closed containers at ambient temperature so that solvent could not escape, polymerization occurred to give a solution too thick to flow after ≦15 min for CH$_2$Cl$_2$, while samples containing THF or toluene were viscous but would still flow. (Samples containing acetone and MEK formed a polymer precipitate, and therefore no direct comparison with CH$_2$Cl$_2$ could be made for these solvents in the closed containers.)

This example demonstrates the effect of using different catalyst solvent systems to affect polymerization rates. In particular, some solvents are observed to retard polymerization rates, and are particularly useful in maintaining lower viscosity in a polymerizable mixture prior to coating and polymerization by heating and simultaneous evaporation of solvent.

Example 13

Alkyl NB(CO$_2$) esters were prepared from the reaction of 5-norbornene-2-carbonyl chloride (hereinafter "NBCOCl," available from Pfaltz and Bauer, Inc.; Waterbury, Conn.) and the corresponding alcohol following standard synthetic organic practices. The starting compound NBCOCl and the product ester were mixtures of endo and exo isomers.

For example, NBCOCl was added dropwise to excess ethanol. The resulting solution was treated with NaHCO$_3$ to remove HCl, filtered, and stripped of excess ethanol under vacuum to yield ethyl NB(CO$_2$), that is, the ethyl ester of norbornene-2-carboxylic acid.

Variations of this procedure, such as the use of different solvents, stoichiometries, and workup procedures, will be apparent to those skilled in the art. A particularly useful variation with high-boiling alcohols involves reacting a slight excess of NBCOCl with the liquid alcohol (heating to just above the melting point if it is a solid at room temperature) with no added solvent and adding about an equal volume of water (and optionally an organic solvent such as MBE to maintain the liquid state of the organic phase) and NaOH until the aqueous phase is basic (i.e., pH about 10). The NaOH neutralizes the HCl from reaction of the carbonyl chloride and alcohol and also removes excess NBCOCl as the water-soluble sodium 5-norbornene-2-carboxylate. The organic phase can subsequently be washed with water, dried with, for example, anhydrous MgSO$_4$, and stripped of solvent.)

Fluoroalkyl NB(CO$_2$) esters were prepared in a similar manner from NBCOCl and fluoroalkyl alcohols such as C$_7$F$_{15}$CH$_2$OH, (perfluorocyclohexyl)CH$_2$OH, and C$_8$F$_{17}$SO$_2$N(Et)CH$_2$CH$_2$OH, prepared according to the methods described in U.S. Pat. Nos. 3,734,962, 3,476,753, 2,803,656, and 2,519,983, and in Hudlicky (ed.), *Chemistry of Organic Fluorine Compounds*, 2d ed., 73–76 (1976; Halsted Press, N.Y.), all of which are incorporated herein by reference. For primary alkyl alcohols such as ethanol and C$_8$F$_{17}$SO$_2$N(Et)CH$_2$CH$_2$OH, reaction rates with NBCOCl were nearly instantaneous upon mixing; rates were slower when one methylene group separates the fluorocarbon group from the alcohol group, as in C$_7$F$_{15}$CH$_2$OH and (perfluorocyclohexyl)CH$_2$OH, typically taking about an hour at about 50° C.

Silicone substituted norbornenes (hereinafter referred to as "SiNB" were prepared from silicone hydrides and norbornenes covalently bonded to unstrained olefinic groups, by the so-called hydrosilation of the unstrained olefinic group.

"SiNB-A" was prepared as follows: 28.03 g vinylnorbornene and 16.20 g pentamethyldisiloxane (available from Hüls America; Bristol, Pa.) were cooled to about −40° C. About 50 mg divinyltetramethyldisiloxane)$_2$Pt(0) (Hüls) was added, and the reaction was allowed to proceed at −40° C. for about 64 hours. The reaction mixture was warmed to room temperature, and excess VNB removed by vacuum distillation. Variations of this procedure, employing different stoichiometries, catalysts, or reaction conditions will be apparent to those skilled in the art.

Hydrosilation of VNB occurs predominantly at the vinyl group, not the ring-strained norbornene C=C bond, producing the ring-strained olefin 5-[2-(pentamethyldisiloxy) ethyl]-2-norbornene. However, the use of excess VNB and reaction temperatures below ambient is necessary to reduce the formation of side products occurring from hydrosilation of the ring-strained norbornene C=C bond, which are undesirable because they are either unreactive or contain residual vinyl functionality (which acts as a chain transfer agent, reducing molecular weight, in subsequent polymerization processes). The conditions described here for the synthesis of "SiNB-A" yield product containing no more than 1% (by gas chromatographic analysis) of any single side product.

Crosslinker "SiNB-B" is prepared in a similar manner, from 20.0 g 1,1,3,3,5,5-hexamethyltrisiloxane (Hüls) and 48.4 g VNB. (Excess VNB helps to prevent formation of higher molecular weight material. Temperature control is not as important, because side reactions mostly produce silicones bearing one ring-strained (reactive) olefin, small amounts of which are inconsequential in the use of the product as a crosslinking agent.)

Example 14

This example illustrates the polymerization in air of silicone substituted norbornenes with varying amounts of crosslinker. The liquid silicone substituted norbornenes were mixed as indicated in Table 4, then a portion of THF solution of catalysts (26.0 mg Ir-2, 40.8 mg Zn(DSN)$_2$, and 69.1 mg IRGANOX 1010 stabilizer (Ciba-Geigy Inc.; Ardsley, N.Y.) in 2.7 g THF) was added in amounts to give Ir levels (in parts per thousand) as shown. Samples were poured into metal pans, to give liquid films with thicknesses of 0.3 to 0.8 mm, and polymerized in the air at 90° C. for 2 minutes, although solid films formed in as little as 30 seconds.

TABLE 4

Polymerization of Silicone-Substituted Norbornenes

| Sample | SiNB-A (g) | SiNB-B (g) | Ir (ppt) |
|---|---|---|---|
| A | 0 | 0.68 | 2.0 |
| B | 0.91 | 0.87 | 2.1 |
| C | 1.37 | 0.19 | 1.5 |
| D | 1.55 | 0.025 | 1.6 |

Polymerized Samples A, B, and C gave translucent films that were easily lifted from metal pans. These films were flexible but crumbled easily when rolled between finger and thumb. Polymerized Sample D was very soft and tacky.

Example 15

This example demonstrates the polymerization of organosilicon- and fluorocarbon-substituted norbornenes supported on paper. The polymerized compositions are resistant to water and/or oil, and are useful as packaging materials or liners.

A. A polymerizable composition of 0.50 g SiNB-A, 0.036 g SiNB-B, 2.26 g CH$_2$Cl$_2$, and 2.0 mg, of which about 0.7 mg dissolved, [Ir(cyclooctene)$_2$Cl]$_2$ was prepared. A 5.1 cm×5.1 cm piece of Potsdam 29.5 creped paper was placed in the solution edgewise, and the solution wicked up the paper to within about 0.6 cm of the top when it was removed. ("Potsdam 29.5" refers to paper that weights 29.5 pounds per ream, i.e., 3000 square feet, and that is from the Potsdam, N.Y., mill of the Little Rapids Corp. of Shawano, Wis.)

The paper was placed in a 90° C. oven for about 150 seconds. For comparison, a portion of the polymerizable composition was placed in a metal pan, and become solid under these conditions. (See Example 14.) Water squirted onto paper-supported polymer beaded up and ran off the sample, except at an untreated edge of the paper, where it rapidly wetted and was absorbed. Mineral oil was absorbed by the treated paper.

B. A polymerizable composition of 21.79 g 5-[C$_7$F$_{15}$CH$_2$OC(O)]-norborn-2-ene and catalyst solution (made by dissolving 42 mg [Ir(cyclooctene)$_2$Cl]$_2$, 83 mg Zn(DSN)$_2$ and 90 mg IRGANOX 1010 stabilizer in 4.69 g THF) was prepared. Paper (as in A above) was immersed in the polymerizable composition, drawn out and allowed to drain for a few seconds, then heated at 90° C. for 20 minutes. The support polymer samples contained 18% (by weight) polymer and 82% (by weight) paper.

The untreated paper rapidly wetted and absorbed water squirted thereon. The polymer-supported paper did not wet; rather, water beaded up and rolled off of it. Mineral oil also was absorbed by the untreated paper, but a drop of mineral oil had not been absorbed by the paper-support polymer after two hours, remaining as a drop on top of the treated paper.

Example 16

This example demonstrates the polymerization of organosilicon-substituted norbornenes supported on paper. The polymerized compositions are less adherent to a PSA than the untreated paper, and are useful as release liners or in PSA constructions. Other polymer compositions show increased adhesion, and are useful as primers.

A. A polymerizable composition of SiNB-A (1.72 g), SiNB-B (0.129 g), n-hexadecyl NB(CO$_2$) and catalyst solution (0.77 g of a batch of catalyst made by dissolving 11.5 mg [Ir(cyclooctene)$_2$Cl]$_2$, 27.2 mg Zn(DSN)$_2$ and 60.9 mg IRGANOX 1010 stabilizer in 4.9198 g THF) was prepared. It was coated onto a supercalendered Kraft paper (Nicolet Paper Co.; Green Bay, Winn.) with a Number 3 Meyer bar (wire-wrapped rod) and heated at 90° C. for 5 to 8 minutes. A piece of 3M 8-8890 tape was applied to a partially coated piece of paper, so that adhesion to untreated paper and to the paper-supported polymer could be observed. The tape adhered so well to the untreated paper that the paper ripped, but it released with modest pulling from the paper-supported polymer without ripping. The tape, after removal still adhered well to itself, a qualitative test for transfer of (releasing) polymer to adhesive.

B. A polymerizable composition of 0.957 g SiNB-A, 0.109 g SiNB-B, 0.218 g n-tetradecyl NB(CO$_2$), and 0.978 g catalyst (from a batch prepared as in A above) was prepared, coated, and polymerized as above. It was tested with 3M 8-8890 tape, which adhered so well to the paper-supported polymer that the tape backing ripped and significant portions of adhesive and backing remained stuck to the paper-supported polymer. This demonstrates excellent adhesion of the adhesive to the ROMP polymer, and enhanced strength of the paper support (which ripped in A above).

Example 17

This example shows the polymerization of an alkylnorbomene to give a saturated paper. 1.00 g 5-hexyl-2-norbornene was mixed with a catalyst solution (1.8 mg [Ir(cyclooctene)$_2$Cl]$_2$, 2.7 mg Zn[N(SO$_2$CF$_3$)$_2$]$_2$, and 4.9 mg IRGANOX 1010 stabilizer dissolved in 0.49 g THF). The end of a strip of creped paper (Potsdam 29.5) was placed in the solution and the solution was allowed to wick up the paper. The monomer-saturated paper was then placed in a 90° C. oven and heated for approximately three minutes, during which time polymerization occurred.

Water would not wet the saturated paper; rather, it beaded up. The untreated portion of the paper rapidly absorbed water.

Various modifications and alterations that do not depart from the scope and spirit of this invention will become apparent to those skilled in the art. This invention is not to be unduly limited to the illustrative embodiments set forth herein.

We claim:

1. A composite article comprising a paper support, at least a portion of which is at least partially saturated with a composition comprising a ring-strained cyclic olefinic monomer and a transition metal-containing compound.

2. The composite article of claim 1 wherein a second portion of said paper support is coated with silicone.

3. The composite article of claim 1 wherein said paper support is substantially free of sulfur.

4. The composite article of claim 1 wherein said one or more monomers is 2-norbornene substituted with at least one functional group at the 5 position.

5. The composite article of claim 4 wherein said functional group is a C$_4$–C$_{20}$ alkyl group, an organosilicon group containing 1 to 300 silicon and 0 to 300 oxygen atoms, or $C_1$–$C_{16}$ fluorocarbon group.

6. A composite article comprising a paper support, at least a portion of which is at least partially saturated with the polymerization product of one or more ring-strained cyclic olefinic monomers.

7. The composite article of claim 6 wherein a second portion of said paper support is coated with silicone.

8. The composite article of claim 6 wherein said paper support is substantially free of sulfur.

9. The composite article of claim 6 wherein said one or more monomers is 2-norbornene substituted with at least one functional group at the 5 position.

10. The composite article of claim 9 wherein said functional group is a $C_4$–$C_{20}$ alkyl group, an organosilicon group containing 1 to 300 silicon and 0 to 300 oxygen atoms, or $C_1$–$C_{16}$ fluorocarbon group.

11. The composite article of claim 6 wherein said polymerization product completely saturates said paper support.

12. The composite article of claim 6 wherein the weight ratio of said polymerization product to said paper support is in the range of 0.1 to 10.

13. The composite article of claim 6 further comprising a functional or decorative coating applied to at least one side of said composite article.

14. A method of making the composite article of claim 6 comprising the steps:

a) at least partially saturating at least a portion of a paper with a composition comprising a ring-strained cyclic olefinic monomer and a transition metal-containing compound; and b) allowing said monomer to polymerize.

15. The method of claim 14 wherein said polymerization step is accelerated by at least one of the application of heat and actinic radiation.

* * * * *

UNITED STATES PATENT AND TRADEMARK OFFICE
CERTIFICATE OF CORRECTION

PATENT NO.    : 6,586,082 B1
DATED         : July 1, 2003
INVENTOR(S)   : Brown, Katherine A.

It is certified that error appears in the above-identified patent and that said Letters Patent is hereby corrected as shown below:

<u>Column 4,</u>
Line 49, reads "$(CR^2R^3)m$ where" should be -- $(CR^2R^3)_m$ where --

<u>Column 15,</u>
Line 4, reads "2.5 cm 12.5 cm" should be -- 2.5 cm'  12.5 cm --
Line 42, reads "5-octyl-2-norbomeme" should be -- 5-octyl-2-norbornene --

<u>Column 20,</u>
Lines 36-37, reads "alkylnorbomeme" should be -- alkynorbornene --

Signed and Sealed this

Eighteenth Day of May, 2004

JON W. DUDAS
*Acting Director of the United States Patent and Trademark Office*